United States Patent
Yu et al.

(10) Patent No.: US 10,007,421 B2
(45) Date of Patent: Jun. 26, 2018

(54) NATURAL HANDWRITING DETECTION ON A TOUCH SURFACE

(71) Applicant: Lenovo (Singapore) Pte. Ltd., Singapore (SG)

(72) Inventors: Jonathan Jen-Wei Yu, Raleigh, NC (US); Aaron Michael Stewart, Raleigh, NC (US); Jeffrey E. Skinner, Raleigh, NC (US); Thomas Ryan Cook, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 79 days.

(21) Appl. No.: 14/816,728

(22) Filed: Aug. 3, 2015

(65) Prior Publication Data

US 2017/0038956 A1    Feb. 9, 2017

(51) Int. Cl.
*G06F 3/0488*    (2013.01)
*G06K 9/00*    (2006.01)
*G06K 9/22*    (2006.01)
*G06F 3/041*    (2006.01)

(52) U.S. Cl.
CPC ........ *G06F 3/04883* (2013.01); *G06F 3/0412* (2013.01); *G06K 9/00161* (2013.01); *G06K 9/00355* (2013.01); *G06K 9/00402* (2013.01); *G06K 9/222* (2013.01); *G06F 2203/04104* (2013.01); *G06F 2203/04808* (2013.01)

(58) Field of Classification Search
CPC ....... G06F 3/04883; G06F 2203/04104; G06F 2203/04808; G06K 9/00161; G06K 9/00402
See application file for complete search history.

(56) References Cited

U.S. PATENT DOCUMENTS

| | | | | |
|---|---|---|---|---|
| 9,274,702 | B2* | 3/2016 | Nishidate | G06F 3/04883 |
| 2006/0238518 | A1* | 10/2006 | Westerman | G06F 3/0235 345/173 |
| 2008/0042988 | A1 | 2/2008 | Westerman et al. | |
| 2013/0093664 | A1* | 4/2013 | Nishidate | G06F 3/04883 345/156 |
| 2014/0300554 | A1* | 10/2014 | Samuel | G06F 21/32 345/173 |
| 2015/0363035 | A1* | 12/2015 | Hinckley | G06F 3/0383 345/173 |
| 2016/0077650 | A1* | 3/2016 | Durojaiye | G06F 3/041 345/173 |

FOREIGN PATENT DOCUMENTS

| | | |
|---|---|---|
| CN | 101630219 A | 1/2010 |
| CN | 101655771 A | 2/2010 |
| CN | 102156578 A | 8/2011 |
| CN | 103268198 A | 8/2013 |
| TW | 201401174 A | 1/2014 |

\* cited by examiner

*Primary Examiner* — Xuemei Zheng
(74) *Attorney, Agent, or Firm* — Ference & Associates LLC

(57) ABSTRACT

One embodiment provides a method including: detecting, at a touch surface, at least two points of contact of a hand of a user; identifying, based on a configuration of the at least two points of contact, an input provided by the user as handwriting input; and displaying, on a display screen, the handwriting input, wherein the handwriting input is identified as being input at a location relative to the at least two points of contact of the hand of the user. Other aspects are described and claimed.

18 Claims, 5 Drawing Sheets

NATURAL HANDWRITING DETECTION ON A TOUCH SURFACE

BACKGROUND

The prevalence and portability of information handling devices (e.g., smart phones, tablets, personal computers, laptop computers, etc.) allows users to use these devices to provide and accept input in a variety of locations. For example, a small business owner may accept credit cards using a smart phone as opposed to needing a dedicated credit card machine and land line. As another example, a utility meter reader may carry a tablet used to record meter readings. As the technology has grown, the devices allow input through a variety of different mechanisms, for example, traditional keyboards, mice, microphones, cameras, touch surfaces, and the like.

To assist in ever changing needs and desires and increase device portability, traditional keyboards and input methods are being replaced by touch surfaces to allow for a larger variety of input types, for example, the touch surface can allow for text input as well as drawings, sketches, formulas, etc., without the constraint of a keyboard or mouse. To provide the touch input a user traditionally uses a stylus or other touch surface writing utensil ("touch stylus"). Sometimes these touch stylus' are unique to a particular touch surface in that the touch surface only recognizes input from that type of stylus. Once the stylus has been lost or broken, the user has to replace the stylus which can become very expensive.

BRIEF SUMMARY

In summary, one aspect provides a method, comprising: detecting, at a touch surface, at least two points of contact of a hand of a user; identifying, based on a configuration of the at least two points of contact, an input provided by the user as handwriting input; and displaying, on a display screen, the handwriting input, wherein the handwriting input is identified as being input at a location relative to the at least two points of contact of the hand of the user.

Another aspect provides an information handling device, comprising: a touch surface; a display screen operatively coupled to the touch surface; a processor operatively coupled to the touch surface and display screen; a memory device that stores instructions executable by the processor to: detect, at the touch surface, at least two points of contact of a hand of a user; identify, based on a configuration of the at least two points of contact, an input provided by the user as handwriting input; and display, on the display screen, the handwriting input, wherein the handwriting input is identified as being input at a location relative to the at least two points of contact of the hand of the user.

A further aspect provides a product, comprising: a storage device that stores code executable by a processor, the code comprising: code that detects, at a touch surface, at least two points of contact of a hand of a user; code that identifies, based on a configuration of the at least two points of contact, an input provided by the user as handwriting input; and code that displays, on a display screen, the handwriting input, wherein the handwriting input is identified as being input at a location relative to the at least two points of contact of the hand of the user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
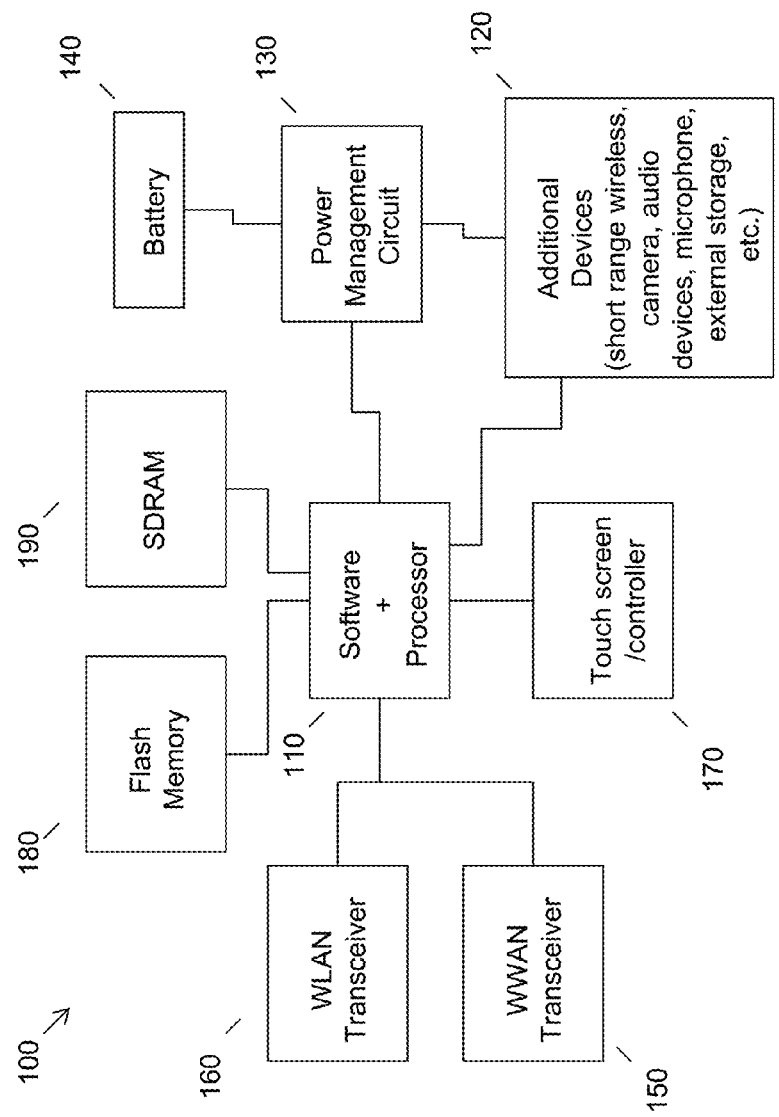
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The increased functionality of portable information handling devices ("devices") has allowed more flexibility for users. For example, businesses can now take credit and debit card payments using devices attached to the business owner's smart phone. The customer can then provide a signature on the smart phone's touch screen. Generally, however, in order to accept this handwriting input, the device has to have particular technology that allows the device to accept stylus input accurately. For example, the device may need a digitizer or high resolution touch capacitive display. In such cases, the technology may not be sensitive enough to reproduce natural handwriting.

One current method to assist in accurately reproducing handwriting is the use of a stylus, pen, or other writing utensil made for a touch screen ("touch stylus" or "stylus").

However, to accurately input handwriting to a digital format using such a stylus generally requires use of a stylus with advanced technology. For example, the stylus may need to be an active capacitive pen, be a capacitive tipped stylus, or have an EMR (electo-magnetic resonance) digitizer. With capacitive stylus solutions, the contact point needs to be a certain size in order to detect the position of the stylus point, which makes it difficult to control the digital ink with precision. Another problem with the use of these stylus' is that they tend to get lost or misplaced. If a user loses the touch screen's unique writing utensil, providing the handwriting input may be difficult because the touch surface may not accept input from just any pen or pencil. In addition, such utensils which are not designed for touch surfaces may scratch or damage the touch surface. Replacing such a writing utensil can be expensive.

One solution has been to accept a touch input provided by a user's finger. This generally involves a user using a single finger and providing an input using the tip of the finger. In providing such input, the ink is generally occluded by the finger making it difficult to see where the ink is being displayed and causing issues when trying to provide precise ink strokes. Another issue with this solution is that handwriting with a single finger often does not reproduce handwriting that appears natural to the user. Additionally, not only does the handwriting not appear natural to the user, but providing such an input feels unnatural for a user, especially if the user has been taught handwriting with use pens, pencils, and other traditional writing utensils. This is due to the fact that when providing handwriting input holding a conventional writing utensil entails holding the utensil between two or three fingers and then guiding the utensil into making the desired handwriting input, which allows for more precise and controlled movements. Therefore, using just the single fingertip results in handwriting input that looks unnatural or crude. When attempting to provide a signature, for example, at the store, the "signature" provided by the fingertip looks very different from the signature of the person when they are signing something with a traditional writing utensil.

These technical issues present problems for users in that providing natural handwriting input to a touch surface may be difficult. The conventional solution of using a stylus to provide handwriting input (e.g., sketches, drawings, formulas, text, symbols, etc.) generally requires the use of a particular kind of stylus with advanced technology which allows the touch surface to detect the stylus and input. Some of these stylus' require a particular sized stylus tip in order to be detected which decreases the precision of the ink strokes that can be provided. Additionally, if these stylus' are lost or misplaced, replacing them can be costly. Providing handwriting input using a finger tip eliminates the need for a stylus, however, the handwriting input produced using this method looks clumsy and unnatural, thereby not accurately reproducing handwriting input.

Accordingly, an embodiment provides a method of detecting a more natural handwriting input at a touch surface. Using this method, a user can simulate a more natural handwriting grip, for example, a tripod grip, a quadropod grip, or other grip which the user may use to hold a writing utensil, which can then be used to provide handwriting input to a touch screen. One embodiment may detect at least two points of contact of a hand of user, for example, part of a user's palm and part of a user's finger, parts of two different fingers, or other contact points. Based upon the configuration of the at least two points of contact, an embodiment may identify the user is attempting to provide a handwriting input. The points of contact may also be identified as a contact signature for a user. This contact signature may be identified for a particular user or may just be identified as a handwriting contact signature to trigger a handwriting mode.

An embodiment may then display the input as handwriting input at a location relative to the points of contact. For example, if the user is providing points of contact similar to a tripod grip, the handwriting input may be displayed at the location where the fingertips come together. One embodiment may additionally display a graphic depicting a writing utensil (e.g., pen, pencil, marker, crayon, paint brush, etc.) at a location relative to the points of contact. For example, a pencil graphic may be displayed at the location where the fingertips come together and the handwriting input may then be displayed at the tip of the pencil graphic.

In one embodiment, a user may be able to provide additional input to change the input type associated with the handwriting input. For example, a user may provide a tap with their finger cluster and that may change the handwriting input from a pencil to an eraser. Multiple taps may perform additional actions or change the handwriting input to different input types. The user may additionally provide input from another source. For example, without moving the points of contact of the handwriting hand, the user may provide input using their other hand. In one embodiment, this type of input may cause an interface to be displayed to allow a user to modify attributes associated with the handwriting input.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen or touch surface 170 for data input and display/rendering. System 100 also typically includes various memory devices, for example flash memory 180 and SDRAM 190.

Figure 2:
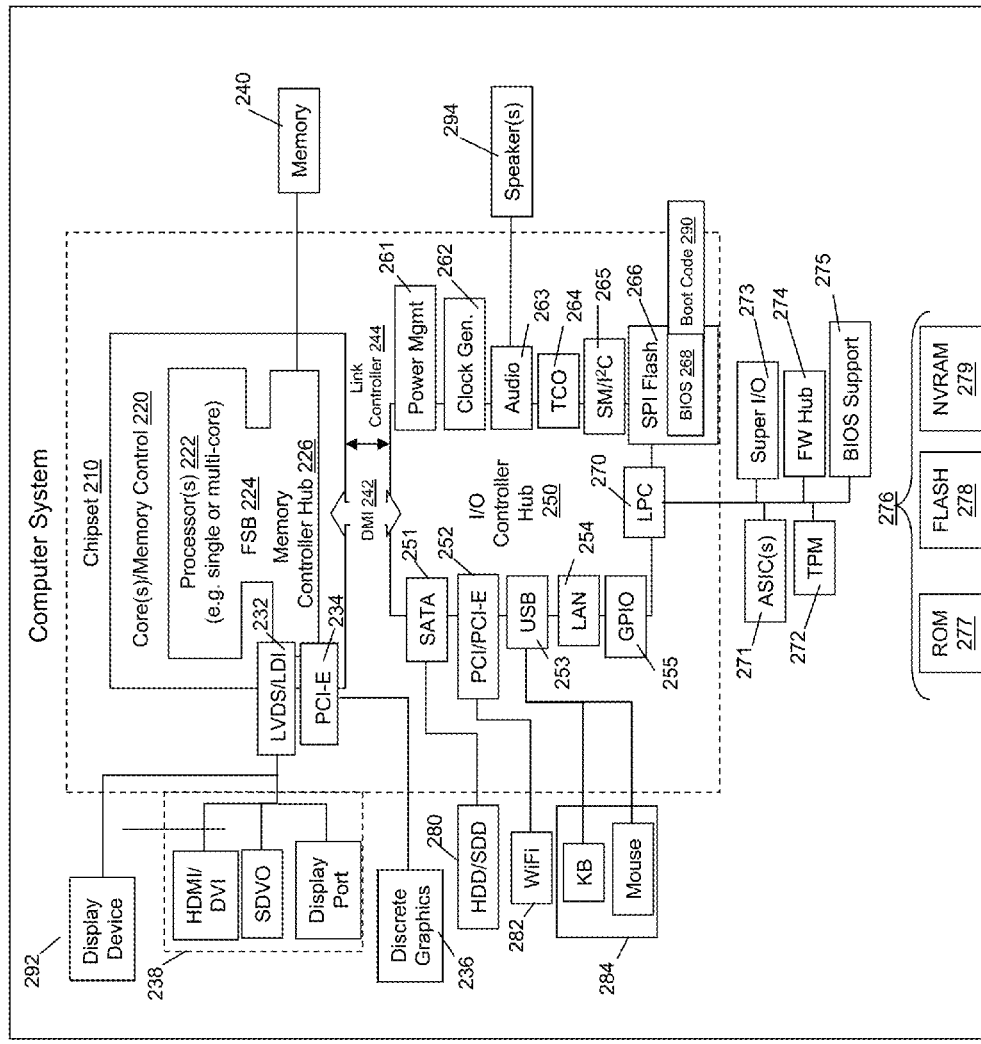
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to provide input, particularly touch or handwriting input. Additionally, circuitry as for example outlined in FIG. 1 or FIG. 2, may be used to process or store contact points in determining if handwriting input is being provided. For example, the circuitry outlined in FIG. 1 may be implemented in a tablet or smart phone embodiment, whereas the circuitry outlined in FIG. 2 may be implemented in a personal computer embodiment.

Figure 3:
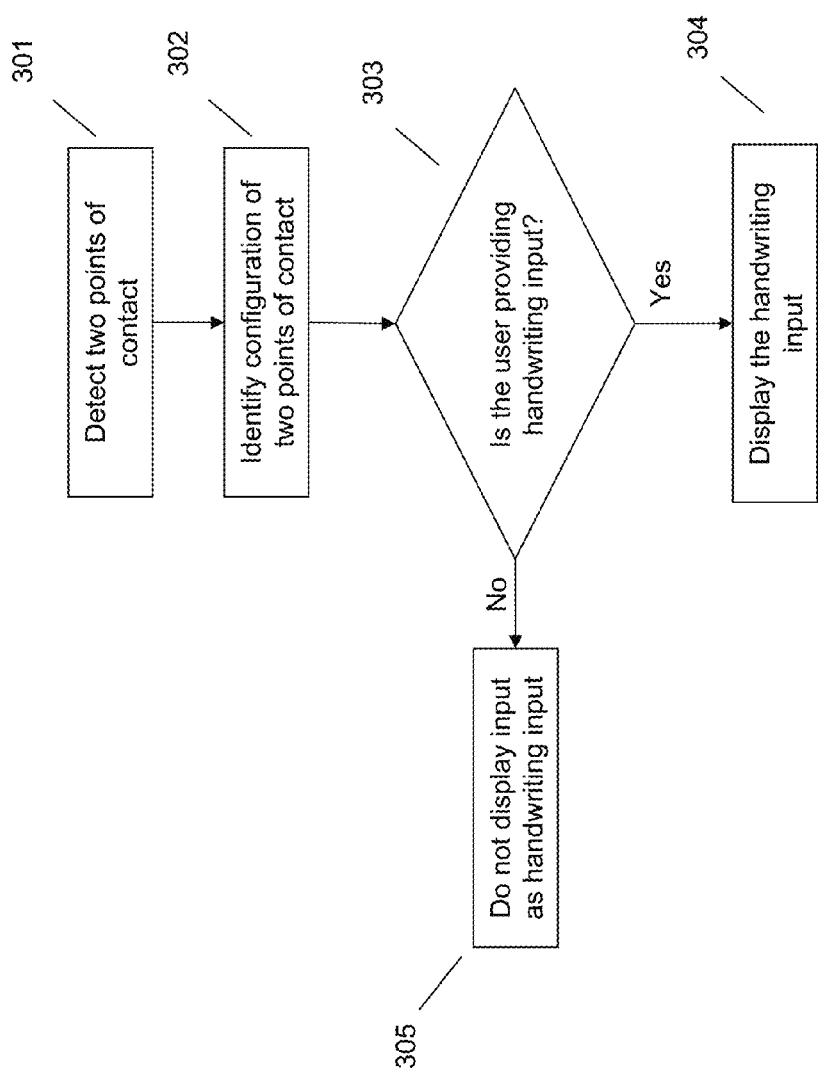
FIG. 3 illustrates an example method of natural handwriting detection on a touch surface.

Referring now to FIG. 3, at 301, an embodiment may detect at a touch surface at least two points of contact of a hand of a user. The points of contact may comprise different parts of the user's hand, for example, a part of the palm, part of a finger (e.g., knuckle, fingertip, etc.), and the like. As an example embodiment, the user may be resting their hand on a touch surface and one point of contact may be the user's palm and another point of contact may be a fingertip of the user. As another example, one of the points of contact may be one fingertip and the other may be another fingertip. The detected points of contact may be touching the touch surface, for example, the user's hand resting on the touch surface. Alternatively, the points of contact may not be touching the touch surface but may instead be detected as close to the touch surface. For example, a device may have the ability to detect hovering inputs, such as the user's fingertips above the touch surface. These hovering inputs may then be detected as a point of contact.

An embodiment may detect the points of contact on a single touch surface, for example, the points of contact are all contained on a single touch surface. Alternatively, the two points of contact may be on multiple touch surfaces or surfaces which can detect pressure and/or contact. For example, a touch screen or surface of an information handling device may be too small for the user's hand to rest on the surface. However, the bezel surrounding the surface may include pressure sensors that can detect the user's hand. The touch surface and the bezel may both provide input that allow an embodiment to detect the at least two points of contact.

Figure 4:
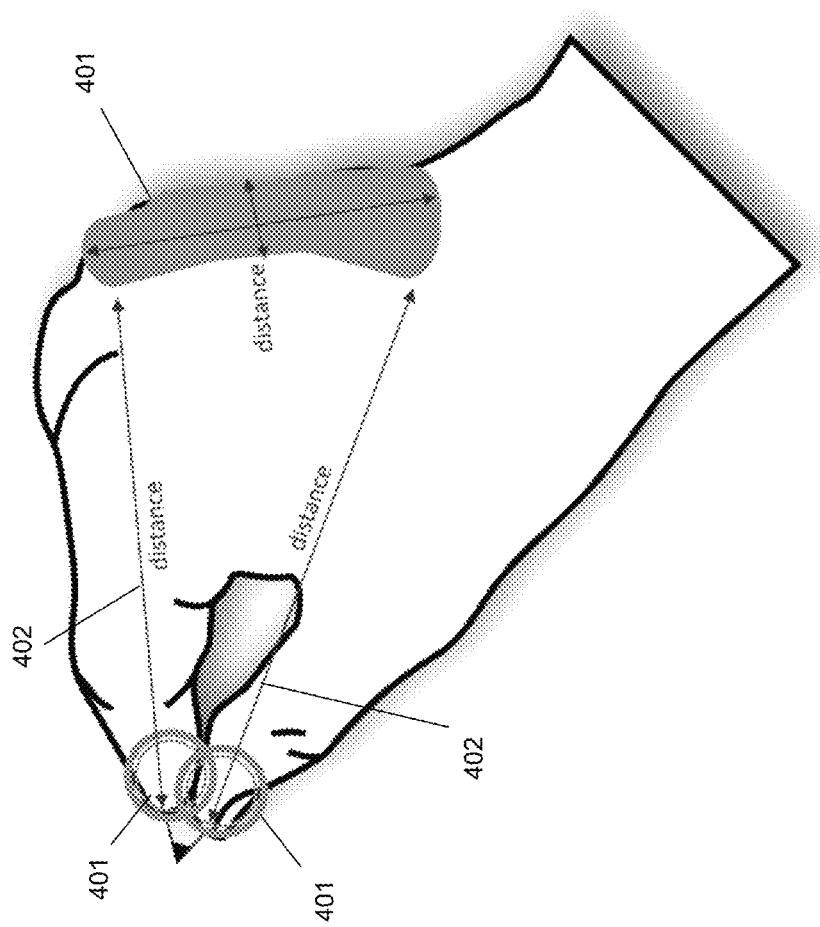
FIG. 4 illustrates an example contact signature for detecting natural handwriting.

At 302, an embodiment may identify the configuration of the points of contact. FIG. 4 shows an example of a user's hand and contact points at a touch surface. Using FIG. 4 as an example, an embodiment may, in identifying the configuration, determine the distance 402 between the points of contact 401 and the shape and size of the points of contact. Additionally, an embodiment may identify other unique characteristics, for example, the angle between the points of contact, the type of contacts (e.g., fingertip versus palm), and the like. Other identifying features for use in identifying the configuration of the points and methods of identifying the configuration are possible and contemplated.

Using the characteristics of the points of contact, one embodiment may identify the configuration as a contact signature of a user. The contact signature may be used to identify the type of input that the user is attempting to provide. For example, using the contact signature, an embodiment may determine that the user is attempting to provide handwriting input versus providing a typing input. Additionally or alternatively, an embodiment may use the contact signature to identify the user as a particular user. For example, an embodiment may compare the received contact signature to known or previously stored contact signatures. These previously stored contact signatures may be linked to a particular user. Additionally, the device may have the ability to identify the user as a particular user through the use of biometric data captured from the contact points (e.g., fingerprint, handprint, palm print, etc.). An embodiment may then use this identification of a particular user for authentication of the user, verifying a signature, invoking custom user settings, or other actions.

At 303, an embodiment may identify, based on the configuration of the at least two points of contact, that the user is attempting to provide a handwriting input. For example, based upon the configuration of the points of contact, an embodiment could identify that the user is simulating how a user would hold a writing utensil. In order to identify that a user is attempting to provide a handwriting input, an embodiment may identify the position of the points of contact relative to each other. In other words, if a user is providing points of contact indicative of natural handwriting an embodiment may identify this as handwriting input. If, however, the user is providing points of contact that are indicative of a user attempting to, for example, zoom in on a particular part of the screen, an embodiment would not identify these contact points as a provision of handwriting input.

The identification of the input as handwriting input may be determined using a statistical set or a comparison set of data. For example, based upon the size and distance of the points of contact, an embodiment may determine with a reasonable probability that the contact points are indicative of a user attempting to provide a handwriting input. The statistical set may be different for different users. For example, in one embodiment a user may indicate that they are an adult female. This information may be used by an embodiment to determine what statistical sets are most applicable to that user. Other forms of identifying the input as handwriting input are possible and contemplated.

If, at 303, an embodiment identifies that the user is not providing handwriting input, an embodiment may not display the input as handwriting input at 305. In other words, if the user is providing an input not identified as handwriting input, an embodiment may accept the input as something other than handwriting input at 305. Alternatively, an embodiment may display a prompt indicating that the input is not being accepted as handwriting input.

Figure 5A:
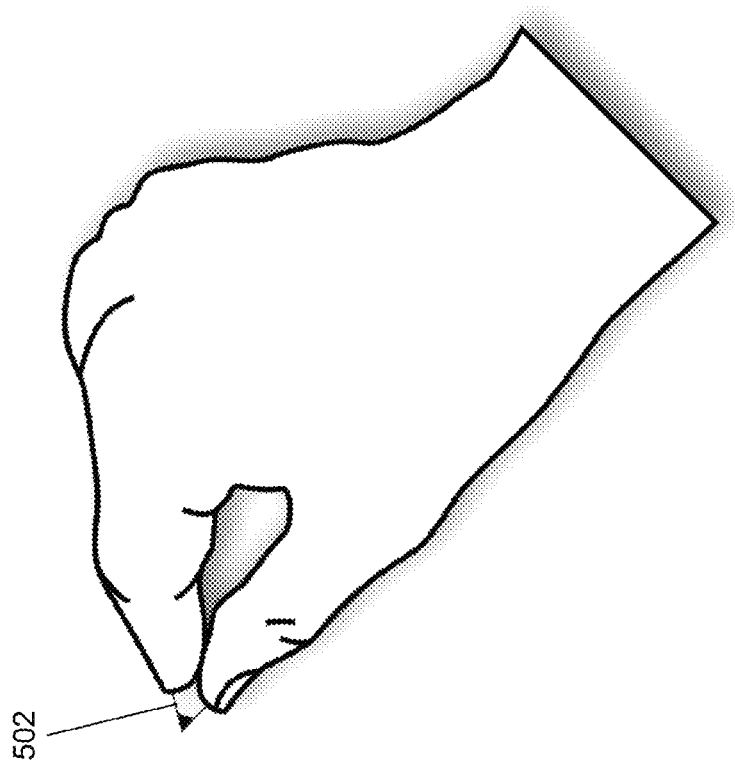
FIG. 5A-FIG. 5B illustrates an example of displaying a graphic of a writing utensil.
Figure 5B:
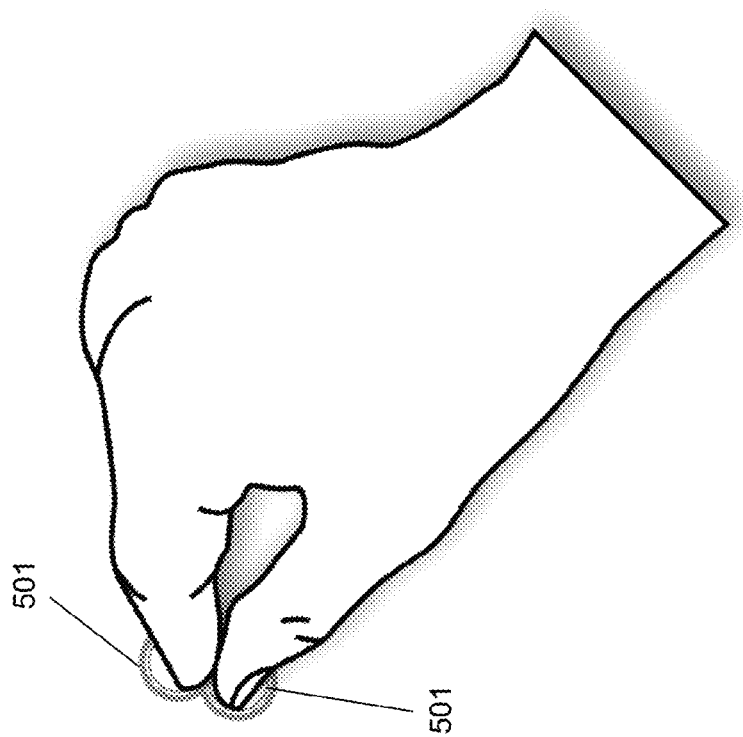

If, however, an embodiment identifies that the user is providing handwriting input at 303, an embodiment may display the handwriting input on a display screen at 304, for example as digital ink. In one embodiment, the display screen may be on a separate plane as the touch surface. Alternatively, the touch surface may additionally serve as the display screen, for example, a touch screen. The handwriting input may be identified as being input at a location relative to the at least two points of contact. For example, referring to FIG. 5A, if the points of contact 501 are identified as the fingertips of the user, an embodiment may display the handwriting input at a location close to the point where the fingertips come together. The handwriting input may not be displayed at exactly the location where the two fingertips come together, but at a predetermined distance from the fingertips in order to prevent the hand from occluding the displayed handwriting input. An embodiment may display the handwriting input as if the user were writing with a writing utensil. For example, if the user forms their hand as if they were holding a writing utensil and then provides input as if they are writing, the handwriting input on the display screen may be displayed as if the simulated writing utensil were writing. One embodiment may display a graphic of a writing utensil as if the utensil were actually in the user's hand as shown at 502 of FIG. 5B. The handwriting input may then be displayed at the tip of the writing utensil graphic.

The display of the handwriting input and/or writing utensil graphic is not just limited to a pen or pencil. The handwriting input display and/or writing utensil graphic may be dependent on the type of input the user has selected. For example, if the user wants to provide a crayon input the display and graphic may reflect this type of input. Other types of input are possible and contemplated, for example, paintbrushes, markers, highlighters, different sized and/or colored writing utensils, erasers, and the like. An embodiment may also sense how much pressure a user provides and the amount of pressure could enable more granular control of the ink, for example, like emulating the angle of a pen tip or brush.

In one embodiment, a user may be able to provide additional input in order to change the input type associated with the handwriting input. For example, a user may tap their fingers "holding" the writing utensil, which may change the input type from, for example, a pencil to an eraser. Providing additional taps may cycle through the different input types or may provide a different modification, for example, changing the color of the handwriting input. The cycle of the input types may be preset in one embodiment, for example, first a pencil, then an eraser, then a pen, and so on. Alternatively, the cycle of the input types may be set by the user. For example, the user generally switches between a blue pen and a black pen, so the user can set that a double tap will produce a black pen rather than a pencil as would have been displayed with the standard input cycle.

A user may also provide other types of input. For example, a user may maintain the contact points detected at 301, and provide input using their other hand. This additional input may, in one embodiment, cause a graphical user interface to be displayed allowing the user to change attributes associated with the handwriting input, for example, ink color, ink width, stroke type, ink size, ink type, and the like. Other types of input could cause different modifications, for example, if a user provides an input where they are pulling their fingers apart it may cause the ink width to become thicker.

The various embodiments described herein thus represent a technical improvement to conventional handwriting input techniques. Using the techniques described here, a user can provide a handwriting input that is more natural both in feel and in look. Rather than needing a dedicated stylus, the user is able to just use their hand and write more naturally without the need for additional hardware. Additionally, rather than the user using just a fingertip to provide input as current techniques allow, the handwriting input looks more natural and closer to a user's normal handwriting.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, at a touch surface, at least two points of contact of a hand of a user;
   identifying, based on a configuration of the at least two points of contact, a contact signature, wherein the contact signature identifies an input provided by the user as handwriting input and is used to identify the user providing the input, wherein the identifying the contact signature comprises identifying a contact position and size associated with each of the at least two points of contact and identifying a distance between each of the at least two points of contact; and
   displaying, on a display screen, the handwriting input, wherein the handwriting input is identified as being input at a location relative to the at least two points of contact of the hand of the user.

2. The method of claim 1, wherein the identifying comprises identifying the positions of the at least two points of contact relative to each other.

3. The method of claim 1, further comprising identifying the user via comparing the contact signature to previously stored contact signatures.

4. The method of claim 1, further comprising displaying, on the touch surface, a graphic depicting a writing utensil at the location of the handwriting input.

5. The method of claim 1, wherein the at least two points of contact comprise at least a part of a palm of the user and at least part of a finger of the user.

6. The method of claim 1, wherein the displaying the handwriting input composes displaying digital ink a predetermined distance.

7. The method of claim 1, wherein the at least two points of contact comprise at least a part of a finger of the user at least part of another finger of the user; and
   wherein the displaying comprises displaying the handwriting input at a predetermined distance from a location where the at least part of finger and the at least part of another finger touch the touch surface.

8. The method of claim 1, further comprising:
   detecting at least one tap at a location of at least one of the at least two points of contact; and
   modifying an input type associated with the handwriting input.

9. The method of claim 1, further comprising:
   detecting another input independent from the at least two points of contact; and
   displaying a graphical user interface allowing the user to modify attributes associated with the handwriting input.

10. An information handing device, comprising:
    a touch surface;
    a display screen operatively coupled to the touch surface;
    a processor operatively coupled to the touch surface and display screen;
    memory device that stores instructions executable by the processor to;
    detect, at the touch surface, at least two points of contact of a hand of a user;
    identify, based on a configuration of the at least two points of contact, a contact signature, wherein the contact signature identities an input provided by the user as handwriting input and is used to identify the user providing the input, wherein to identify comprises identifying a contact position and size associated with each of the at least two points of contact and identifying a distance between each of the at least two points of contact; and
    display, on the display screen, the handwriting input, wherein the handwriting input is identified as being input at a location relative to the at least two points of contact of the hand of the user.

11. The information handling device of claim 10, wherein to identify comprises identifying the positions of the at least two points of contact relative to each other.

12. The information handling device of claim 10, wherein the instructions are further executable by the processor to display, on the touch surface, a graphic depicting a writing utensil at the location of handwriting input.

13. The information handling device of claim 10, wherein the at least two points of contact comprise at least a part of a palm of the user and at least part of a finger of the user.

14. The information handling device of claim 10, wherein to display the handwriting input comprises displaying digital ink at a predetermined distance.

15. The information handling device of claim 10, wherein the least two points of contact comprise at least a part of a finger of the user and at least part of another finger of the user; and
   wherein to display comprises displaying the handwriting input at a predetermined distance from a location where the at least part of a finger and the at least part of another finger touch the touch surface.

16. The information handling device of claim 10, wherein the instructions are further executable by the processor to:
   detect at least one tap sat at a location of at least of the at least two points of contact; and
   modify an input type associated with the handwriting input.

17. The information handling device of claim 10, wherein the instructions are further executable by the processor to:
   detect another input independent from the at least two points of contact; and
   display a graphical user interface allowing the user to modify attributes associated with the handwriting input.

18. A product, comprising:
   a storage device that stores code executable by a processor, the code comprising:
   code that detects, at a touch surface, at least two points of contact of a hand of a user;
   code that identifies, based on a configuration of the at least two points of contact, a contact signature, wherein the contact signature identifies an input provided by the user as handwriting input and is used to identity the user providing the inputm, wherein the identifying the contact signature comprises identifying a contact position and size associated with each of the at least two points of contact and code that identifies a distance between each of the at least two points of contact; and
   code that displays, on a display screen, the handwriting input, wherein the handwriting input is identified as being input at a location relative to the at least two points of contact of the hand of the user.

\* \* \* \* \*